(12) United States Patent
Jeon et al.

(10) Patent No.: US 10,594,424 B2
(45) Date of Patent: Mar. 17, 2020

(54) TIME SYNCHRONIZATION SLAVE APPARATUS CAPABLE OF ADJUSTING TIME SYNCHRONIZATION PERIOD, AND METHOD OF DETERMINING TIME SYNCHRONIZATION PERIOD

(71) Applicant: Research & Business Foundation Sungkyunkwan University, Suwon-si (KR)

(72) Inventors: Jae Wook Jeon, Suwon-si (KR); Jin Ho Kim, Suwon-si (KR); Bo Mu Cheon, Suwon-si (KR); Yong Ju Kim, Suwon-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 377 days.

(21) Appl. No.: 14/725,623

(22) Filed: May 29, 2015

(65) Prior Publication Data

US 2016/0087738 A1 Mar. 24, 2016

(30) Foreign Application Priority Data

Sep. 19, 2014 (KR) .................. 10-2014-0124937

(51) Int. Cl.
  *H04J 3/06* (2006.01)
  *H04W 56/00* (2009.01)
  *H04W 84/20* (2009.01)

(52) U.S. Cl.
  CPC ....... *H04J 3/0667* (2013.01); *H04W 56/0055* (2013.01); *H04W 84/20* (2013.01)

(58) Field of Classification Search
  None
  See application file for complete search history.

(56) References Cited

U.S. PATENT DOCUMENTS 6,295,541 B1 * 9/2001 Bodnar .................. G06F 16/275
6,311,283 B1 * 10/2001 Gonzalez .................. G06F 1/14
  713/400

(Continued)

FOREIGN PATENT DOCUMENTS

JP        2013-29319 A     2/2013
KR    10-2014-0051472 A    5/2014

(Continued)

*Primary Examiner* — Jeffrey M Rutkowski
*Assistant Examiner* — Mehedi S Aley
(74) *Attorney, Agent, or Firm* — NSIP Law

(57) ABSTRACT

A time synchronization slave apparatus and a method of determining a time synchronization period are disclosed. In the apparatus, a time synchronization processing unit performs a time synchronization operation and determines an offset and a rate used to correct local time error based on a calculated time error, a timer corrects the local time based on the determined offset and rate, a time error estimation unit estimates a time error in the local time during a present time synchronization period, and generates excess error information regarding an excess point at which the estimated time error exceeds a threshold allowable time error range, a time synchronization period determination unit determines a subsequent time synchronization period based on the excess error information, and a synchronization period information transmission unit transmits synchronization period information regarding the subsequent time synchronization period to a time synchronization master apparatus.

22 Claims, 3 Drawing Sheets

(56) References Cited

U.S. PATENT DOCUMENTS

| | | | |
|---|---|---|---|
| 2006/0088056 A1* | 4/2006 | Quigley | H04L 1/0003 370/468 |
| 2010/0177600 A1* | 7/2010 | Brykowski | G04G 9/0011 368/11 |
| 2012/0026041 A1* | 2/2012 | Murdock | G01S 5/0289 342/387 |
| 2013/0339742 A1* | 12/2013 | Ignatchenko | H04L 9/3247 713/176 |
| 2015/0173011 A1* | 6/2015 | Das | H04W 16/26 370/328 |

FOREIGN PATENT DOCUMENTS

| | | | |
|---|---|---|---|
| KR | 20140051472 A | * | 5/2014 |
| KR | 20140051472 A | * | 5/2014 |

* cited by examiner

TIME SYNCHRONIZATION SLAVE APPARATUS CAPABLE OF ADJUSTING TIME SYNCHRONIZATION PERIOD, AND METHOD OF DETERMINING TIME SYNCHRONIZATION PERIOD

CROSS-REFERENCE TO RELATED APPLICATIONS

This application claims the benefit under 35 USC 119(a) of Korean Patent Application No. 10-2014-0124937 filed on Sep. 19, 2014 in the Korean Intellectual Property Office, the entire disclosure of which is incorporated herein by reference for all purposes.

BACKGROUND

Field

The following description relates to time synchronization technology based on timestamps.

Description of Related Art

In general, time synchronization technology is technology that synchronizes local time, based on a timer provided in a remote device, with global time. Technologies that are widely known as time synchronization technologies include Network Time Protocol (NTP) and Simple Network Time Protocol (SNTP), each of which is appropriate for applications requiring lower precision. A technology known as Precision Time Protocol (PTP) is known as an appropriate technology for certain applications requiring higher precision.

These time synchronization technologies are chiefly designed as follows. A master providing global time and a slave having local time are configured to exchange special messages with each other. The slave then calculates the error, i.e., the offset, of its local time in relation to the global time of the master and calculates a delay time related to message transmission. Subsequently, the slave may correct its timer.

The offset and the delay time may be calculated by the slave using timestamps in which the transmission and reception times of messages are recorded. In the relatively simple NTP protocol, a slave transmits a first message, including a timestamp of transmission point T1 based on local time, to a master in accordance with global time. First, a master records a timestamp of the reception point T2 of the first message based on the global time. Next, the master transmits a second message, including the timestamps of the reception point T2 of the first message and a transmission point T3 of the second message, to the slave based on the global time after the passage of a threshold period of time. Next, the slave records the timestamp of a reception point T4 of the second message based on the local time. Since the slave knows each of the transmission point T1 (i.e., based on the local time) of the first message, the reception point (i.e., based on the global time) of the first message, the transmission point (i.e., based on the global time) of the second message and the reception point (i.e., based on the local time) of the second message, the slave can calculate the difference between the local time-based transmission point T1 of the first message and a corresponding actual global time-based point, i.e., the offset between local time and global time, and can also calculate actual delay time related to the transmission and reception of the message.

In the PTP protocol, message transmission and reception between a master and an individual slave are repeated three times (or four times in a case in which a request message is included) according to the Institute of Electrical and Electronics Engineers (IEEE) 1588 Standard for a Precision Clock Synchronization Protocol for Networked Measurement and Control Systems, published in 2002 (hereafter "IEEE 1588"), and are repeated seven times (or eight times in a case in which a request message is included) in the case of the more complicated IEEE 1588v2.

Although offset and rate may be corrected once a day in a personal computer system that is normally used for access to the Internet, or for the handling of office work, each slave corrects local time between 1 and 10 times per second in applications requiring microsecond-level precision. Further, a number of slaves correct local time in each period of 1 ms in industrial applications requiring nanosecond-level precision. Although in other contexts 1 ms may be viewed as being short, in this context, if one tick is 1 nanosecond (ns), then a period of 1 ms corresponds to about one million ticks, and thus the time offset and drift during this period cannot not be ignored.

In cases requiring strict determinism, such as that of an industrial network (e.g., in a factory automation facility), or that of a network within a vehicle (e.g., in an advanced driver assistance system (ADAS)), the number of slaves needed to correct local time is large and the correction period is short. Thus, the load attributable to a time synchronization operation may be significant.

Accordingly, there is concern that determinism may be influenced by the additional load of time synchronization operations being performed to ensure the determinism. Hence, there is a need for a scheme that is capable of reducing the load attributable to a time synchronization operation, while still ensuring time precision.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a time synchronization slave apparatus includes a time synchronization processing unit configured to perform a time synchronization operation in conjunction with a time synchronization master apparatus that provides global time, and to determine an offset and a rate used to correct local time based on a calculated time error, a timer configured to correct the local time based on the determined offset and rate during each of a plurality of time synchronization operations, a time error estimation unit configured to estimate the time error in the local time during a present time synchronization period, and to generate excess error information regarding an excess point at which the estimated time error exceeds a threshold allowable time error range, a time synchronization period determination unit configured to determine a subsequent time synchronization period in which the subsequent time synchronization operation is scheduled after a termination of the present time synchronization period based on the excess error information, and a synchronization period information transmission unit configured to transmit synchronization period information regarding the subsequent time synchronization period to the time synchronization master apparatus.

The time error estimation unit may be configured to estimate the time error to occur during the present time synchronization period based on the time error calculated during the previous time synchronization operation.

The time error estimation unit may be configured to compare an estimated time error curve determined based on the time error calculated during the previous time synchronization operation with the allowable time error range, the comparison based on the assumption that the estimated time error curve is realized during the present time synchronization period, and if the estimated time error curve exceeds the allowable time error range before the termination of the present time synchronization period, to generate the excessive error information based on the excess point.

The time error estimation unit may be configured to compare an estimated time error curve determined based on the time error calculated during the previous time synchronization operation, with the allowable time error range, the comparison based on the assumption that the estimated time error curve is realized during the present time synchronization period, and generate the excess error information based on an excess point at which the estimated time error curve exceeds the allowable time error range.

The estimated time error curve may be represented by a linear function having a form in which the time error corrected to 0 during a second previous time synchronization operation linearly increases to the calculated time error during the previous time synchronization operation.

The time synchronization period determination unit may be configured to determine the subsequent time synchronization period based on the excess point if the excess point occurs earlier than the termination point of the present time synchronization period or a the termination point of a default time synchronization period, and to determine the subsequent time synchronization period based on the present time synchronization period or the default time synchronization period if the excess point does not occur earlier than the termination point of the present time synchronization period or the termination point of a default time synchronization period.

The time synchronization period determination unit may be configured to determine the subsequent time synchronization period based on the excess point if the excess point occurs earlier than the termination point of the present time synchronization period or a the termination point of a default time synchronization period, and to determine the subsequent time synchronization period based on the present time synchronization period or the default time synchronization period if the excess point does not occur earlier than the termination point of the present time synchronization period or the termination point of a default time synchronization period.

The time synchronization period determination unit may be configured to determine the subsequent time synchronization period based on a value obtained by subtracting or adding a an extra time interval value based on a time interval value from the previous time synchronization operation to the excess point.

The time synchronization operation may be performed according to at least one of Network Time Protocol (NTP), Simple Network Time Protocol (SNTP), and Precision Time Protocol (PTP).

In another general aspect, a method of determining a time synchronization period for a time synchronization slave apparatus includes a time synchronization processing unit configured to perform a time synchronization operation in conjunction with a time synchronization master apparatus that provides global time, and to determine an offset and a rate used to correct local time based on a calculated time error, and a timer configured to correct the local time based on the determined offset and rate during each of a plurality of time synchronization operations, the method including estimating time error in local time during a present time synchronization period, and generating excess error information regarding an excess point at which the estimated time error exceeds a threshold allowable time error range, determining a subsequent time synchronization period in which the subsequent time synchronization operation is scheduled after a termination of the present time synchronization period based on the excess error information, and transmitting synchronization period information regarding the determined subsequent time synchronization period to the time synchronization master apparatus.

The generating the excess error information may include estimating time error to occur during the present time synchronization period based on the time error calculated during the previous time synchronization operation.

The generating the excess error information may further include comparing an estimated time error curve determined based on the time error calculated during the previous time synchronization operation with the allowable time error range, the comparison based on the assumption that the estimated time error curve is realized during the present time synchronization period, and if the estimated time error curve exceeds the allowable time error range before the termination of the present time synchronization period, generating the excess error information based on the excess point.

The generating the excess error information may include comparing an estimated time error curve determined based on the time error calculated during the previous time synchronization operation with the allowable time error range, the comparison based on the assumption that the estimated time error curve is realized during the present time synchronization period, and generating the excess error information based on an excess point at which the estimated time error curve exceeds the allowable time error range.

The estimated time error curve may be represented by a linear function having a form in which the time error corrected to 0 during a second previous time synchronization operation linearly increases to the calculated time error during the previous time synchronization operation.

The estimated time error curve may be represented by a linear function having a form in which the time error corrected to 0 during a second previous time synchronization operation linearly increases to the calculated time error during the previous time synchronization operation.

The determining the subsequent time synchronization period may include determining the subsequent time synchronization period based on the excess point if the excess point corresponds to a time that is different from the termination point of present time synchronization period or the termination point of a default time synchronization period, and determining the subsequent time synchronization period based on the present time synchronization period or the default time synchronization period if the excess point does not occur earlier than the termination point of the present time synchronization period or the termination point of the default time synchronization period.

The determining the subsequent time synchronization period may include determining the subsequent time synchronization period based on a value obtained by subtracting or adding a an extra time interval value based on a time interval value from the previous time synchronization operation to the excess point.

The time synchronization operation may be performed according to at least one of Network Time Protocol (NTP), Simple Network Time Protocol (SNTP), and Precision Time Protocol (PTP).

The method of determining a time synchronization period may be executed by a computer that includes a computer-readable storage medium having stored therein computer-readable program instructions that, when executed by the computer, cause the computer to perform the method.

In another general aspect, a system including a time synchronization master device and a slave device includes a time synchronization processing unit configured to perform a time synchronization operation in conjunction with the time synchronization master device and to determine an offset and a rate used to correct local time based on a calculated time error, a timer configured to correct the local time based on the determined offset and rate during each of a plurality of time synchronization operations, a time error estimation unit configured to estimate the time error in the local time during a present time synchronization period and to generate excess error information regarding an excess point at which the estimated time error exceeds a threshold allowable time error range, a time synchronization period determination unit configured to determine a subsequent time synchronization period in which the subsequent time synchronization operation is scheduled after a termination of the present time synchronization period based on the excess error information, and a synchronization period information transmission unit configured to transmit synchronization period information regarding the subsequent time synchronization period to the time synchronization master device.

Other features and aspects will be apparent from the following detailed description, the drawings, and the claims

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Figure 1:
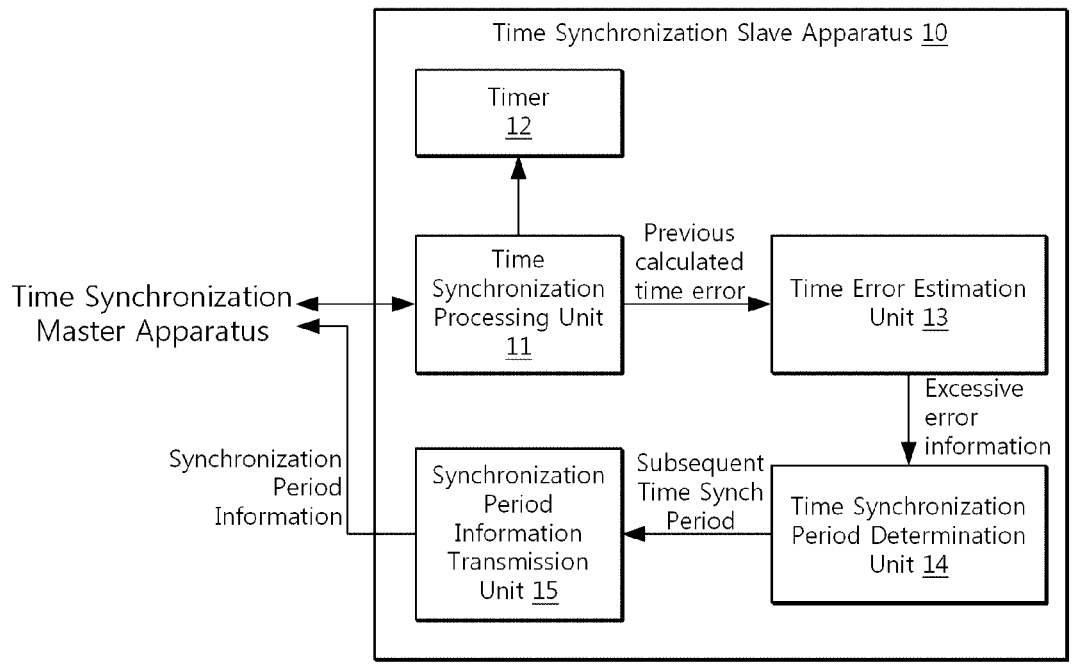
FIG. 1 is a block diagram illustrating an example of a time synchronization slave apparatus.

FIG. 1 is a block diagram illustrating an example of a time synchronization slave apparatus.

Referring to FIG. 1, the time synchronization slave apparatus 10 includes a time synchronization processing unit 11, a timer 12, a time error estimation unit 13, a time synchronization period determination unit 14, and a synchronization period information transmission unit 15.

The time synchronization slave apparatus 10 includes a timer 12 that provides local time. Normally, timers that are produced through a mass production process at low cost, and then distributed, and that are then mounted on electronic devices, have a precision that is limited in terms of the possibility of technical implementation or of economic efficiency. A few time synchronization protocols have been proposed based on a concept in which an error equal to or less than a threshold allowable error can be ensured in an overall system as long as the error of the timer 12 is corrected frequently enough. Such protocols may require a sacrifice of precision.

For example, in a system including nodes supporting time synchronization protocols, such as Institute of Electrical and Electronics Engineers (IEEE) 1588, a device having superior performance, such as a gateway, may be designated as a master apparatus from the outset. Similarly, a node having the highest timer state among various equivalent nodes may be designated as a master apparatus.

In an embodiment, the master apparatus may initiate a time synchronization operation based on a synchronization protocol for each period of, for example, 1 second, 0.1 second or 10 milliseconds (ms). Such time periods may be set based on the operation environment of an application.

In an embodiment, the time synchronization slave apparatus may perform a time synchronization operation according to a particular time synchronization protocol used in conjunction with the external time synchronization master apparatus. Although the time synchronization operation may differ according to the particular protocol used, the synchronization fundamentally includes operations in which each apparatus attaches timestamps to messages based on its own time, and then transmits the message; operations in which each apparatus records a timestamp of the time at which a message has been received based on its own time; and operations in which the offset of local time based on global time and the rate used to correct the timer of the slave are calculated based on timestamps. In an embodiment, the rate refers to the speed at which a tick changes in a timer. A tick may be, for example, a time period equal to a fraction of a second, such as 1 ns or 1 ms. Notably, even when an error in a slave timer has been corrected, the error immediately recurs if the rate is fast or late. For this reason, it is essential to correct the rate of the slave timer. Once the local offset and the rate used to correct time have been determined, the error may be corrected by correcting the timer of the slave based on the determined offset and rate.

Since specific message transmission and reception operations, as well as offset calculation rules used in various time synchronization protocols (such as IEEE 1588 PTP, IEEE 1588 v2, NTP, SNIP or the like), correspond to technology well known to those skilled in the technical field to which the present application pertains, descriptions thereof are omitted.

Based on the above-described technical background information, the time synchronization processing unit 11 of the time synchronization slave apparatus 10 may perform a time synchronization operation in conjunction with the time synchronization master apparatus that provides global time, and may determine offset and rate used to correct local time based on calculated time error. Furthermore, the timer 12 may correct local time based on the offset and the rate determined during a time synchronization operation.

In an embodiment, even when the local time is corrected for each time synchronization period, the slave apparatus timer performance can degrade, and thus time error may recur again.

Figure 2:
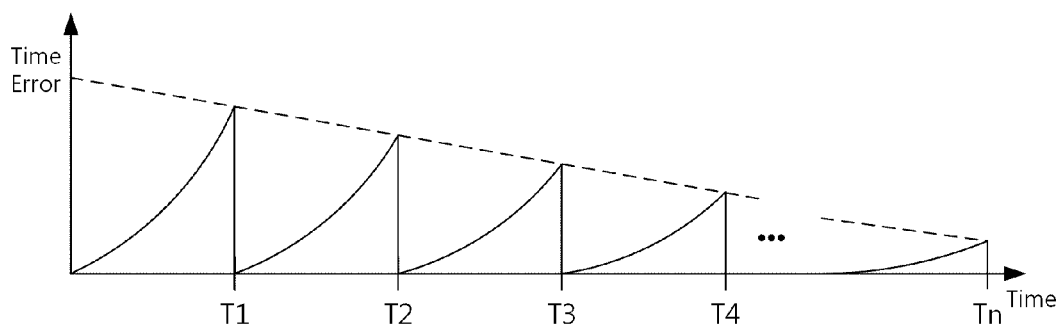
FIG. 2 is a graph illustrating an example of changes in synchronization error over regular synchronization periods according to conventional technology.

FIG. 2 is a graph illustrating an example of changes in synchronization error over regular synchronization periods according to conventional technology.

Referring to FIG. 2, a time synchronization operation is performed in one-second intervals, every second from time T1 to time Tn. The time error decreases to 0 each time the time synchronization operation is performed, and then increases until a subsequent time synchronization operation is performed. Since the rate (i.e., the speed) at which a tick is changed is adjusted whenever a time synchronization operation is performed, a phenomenon in which the extent of time error is gradually decreasing can be observed. Accordingly, when a time synchronization operation is performed at equal time intervals, a saw-toothed curve in which the maximum value of the time error gradually decreases is obtained.

In conventional time synchronization operations, the time it takes for the maximum time error to fall within a desired allowable time error range is undesirably long.

In order to overcome the above problem, a time synchronization slave apparatus 11 according to embodiments further includes a time error estimation unit 13, a time synchronization period determination unit 14, and a synchronization period information transmission unit 15.

The time error estimation unit 13 estimates time error occurring in connection with local time during a present time synchronization (i.e., a period between a previous time synchronization operation and a subsequent time synchronization operation), and generates excess error information regarding an excess point at which the estimated time error exceeds a threshold allowable time error range.

The time synchronization period determination unit 14 may determine a subsequent time synchronization period in which the subsequent time synchronization operation is scheduled after the termination of the present time synchronization period based on the excess error information.

The synchronization period information transmission unit 15 may transmit synchronization period information regarding the determined subsequent time synchronization period to the external time synchronization master apparatus.

The time error estimation unit 13 estimates the time error of the local time during the present time synchronization period based on the time error calculated during the previous time synchronization operation.

In an embodiment, the time error estimation unit 13 may determine an estimated time error curve based on the time error calculated during the previous time synchronization operation, and may compare the estimated time error curve with the allowable time error range, the comparison being performed on the assumption that such an estimated time error curve repeats during the present time synchronization period.

In an embodiment, the estimated time error curve may be represented by a linear function having a form in which the time error corrected to 0 during a second previous time synchronization operation linearly increases to the calculated time error during the previous time synchronization operation. In embodiments, the estimated time error curve may be any of a rectilinear line that corresponds to a first-order function whose slope is positive, a curve of a positive-slope portion selected from the curve of a higher-order function or an index function, or a curve obtained by approximating a graph of empirically observed time errors.

Example reasons for why a time error curve may be estimated are as follows:

Although an error correction is made in accordance with global time whenever a time synchronization operation is performed in the slave apparatus 10, considerable time error may occur and be calculated during a subsequent time synchronization operation. However, the timer 12 has no method of accurately determining its own time error because it has no information about global time during an interval after a correction. In other words, a subsequent synchronization must occur for the timer 12 to obtain information regarding its own time error. It may be expected that time error gradually increases within a time synchronization period.

A form in which the time error increases may be represented by a rectilinear line that connects an initialized point to a calculated time error in a simple manner, or by the curve of the positive slope portion of a two or higher-order function or an index function or an approximate curve based on the results of observation.

In an embodiment, if time error appears earlier and more significantly, a subsequent time synchronization period can be shortened to a period shorter than a present time synchronization period or shorter than a default time synchronization period. Here, the time error estimation unit 13 generates excess error information based on an excess point if an estimated time error curve exceeds an allowable time error range before the termination of the present time synchronization period, and may generate excess error information indicating that the time error does not exceed the limit if an estimated time error curve dos not exceed an allowable time error range before the termination of the present time synchronization period.

In this case, the time synchronization period determination unit 14 determines the subsequent time synchronization period based on the excess point if the excess point occurs earlier than the termination point of the present time synchronization period or the termination point of a default time synchronization period, and may determine the subsequent time synchronization period based on the present time synchronization period or a default time synchronization period if the excess point does not occur earlier than the termination point of the present time synchronization period.

In an embodiment, if the time error increases more slowly, a subsequent time synchronization period can be increased to a period longer than a present time synchronization period or longer than a default time synchronization period. Here, the time error estimation unit 13 may generate excess error information based on an excess point at which an estimated time error curve exceeds an allowable time error range no matter whether the excess point occurs before or after the end point of a present time synchronization period.

As described above, in embodiments, the time synchronization period determination unit 14 may determine the subsequent time synchronization period based on the excess point if the excess point is different from the end point of the present time synchronization period or default time synchronization period, and may determine the subsequent time synchronization period based on the present time synchronization period or default time synchronization period if not.

In embodiments, the time synchronization period determination unit 14 may determine the subsequent time synchronization period based on a value obtained by subtracting or adding a an extra time interval value based on a time interval value from the previous time synchronization operation to the excess point.

In embodiments, the time synchronization period determination unit 14 may determine a time interval from the previous time synchronization operation point to the excess point to be the subsequent time synchronization period.

Figure 3:
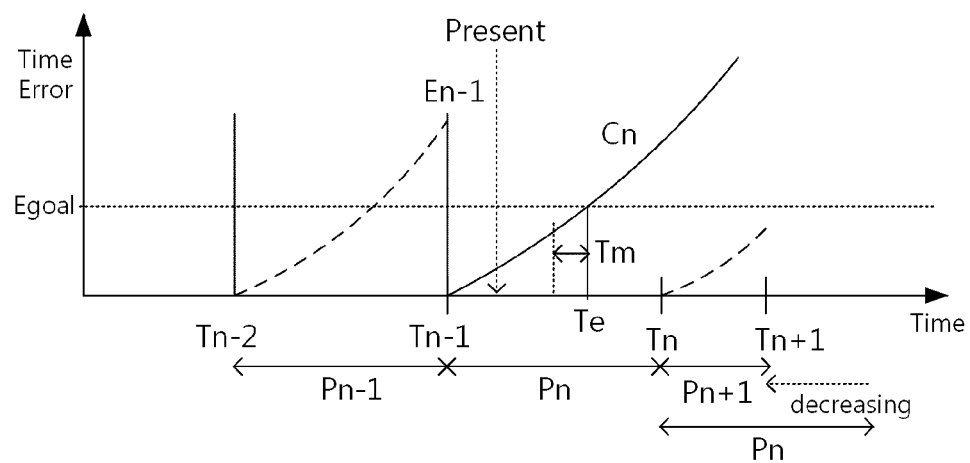
FIGS. 3 and 4 are graphs illustrating examples of changes in synchronization error between successive synchronization operations of a slave apparatus.
Figure 4:
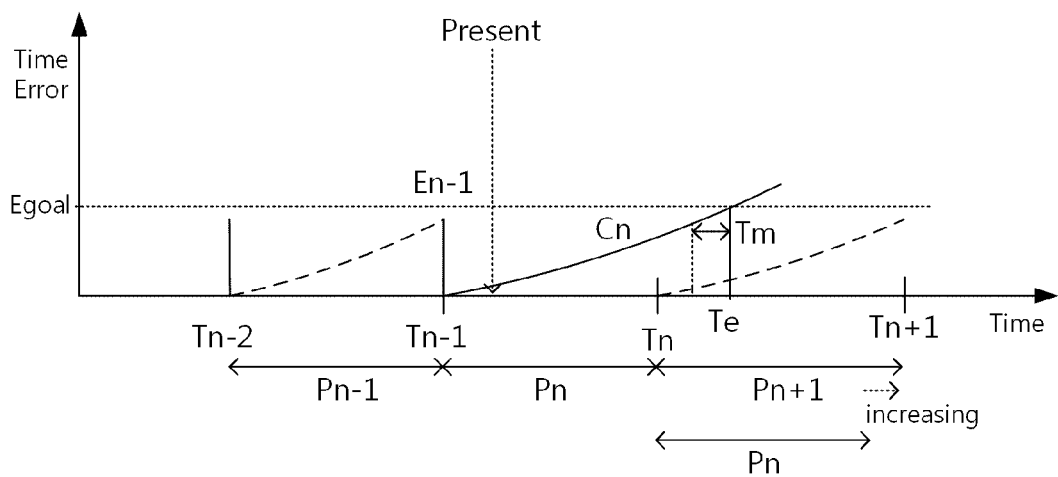

FIGS. 3 and 4 are graphs illustrating examples of changes in the synchronization error between successive synchronization operations of a slave apparatus.

Referring to FIG. 3, in order to determine a subsequent time synchronization period Pn+1 during a present time synchronization period Pn, an estimated time error curve Cn to be used to determine the subsequent time synchronization period Pn+1 during the present time synchronization period Pn from time error En−1 is calculated as a result of a previous time synchronization operation performed at the terminating point Tn−1 of a previous time synchronization period Pn−1 that began after the terminating point Tn−2 of another previous time synchronization period (not shown).

A present point is a point during the present time synchronization period Pn. Since, in this example, a terminating point Tn has not been reached, it is not possible to determine the time error that will actually occur in the present time synchronization period Pn, i.e., until a subsequent time synchronization operation begins based on the termination of the present time synchronization period Pn.

If there is no significant change in the operation state of the timer 12, the time error of the previous time synchronization period Pn−1 is reproduced in the present time synchronization period Pn, and a time error curve Cn is estimated from the time error En−1 calculated as a result of the previous time synchronization operation.

Accordingly, it may be possible to compare the estimated time error curve Cn with the designated allowable time error range Egoal during the present time synchronization period Pn, and to determine the subsequent time synchronization period Pn+1 starting after the termination of the present time synchronization period Pn based on the result of the comparison.

In the illustration of FIG. 3, an excess point Te at which the allowable time error range Egoal intersects the estimated time error curve Cn, i.e., the estimated time error curve Cn intersects the allowable time error range Egoal, occurs before the termination of the present time synchronization period Pn.

Accordingly, in an embodiment, it may be estimated that, if the subsequent time synchronization period Pn+1 is determined to be equal to the present time synchronization period Pn, the time error will exceed the allowable time error range Egoal before the termination of the subsequent time synchronization period Pn+1. Here, if the subsequent time synchronization period Pn+1 is not decreased, the time error continues to exceed the allowable time error range Egoal.

Accordingly, the length of the subsequent time synchronization period Pn+1 may be determined to be equal to or shorter than that of the present time synchronization period Pn+1 or of the default time synchronization.

In an embodiment, the duration of the subsequent time synchronization period Pn+1 may be determined to be equal to any one of a period having a termination point that is earlier than the excess point Te by the predetermined extra time Tm, a period having a termination point that is equal to the excess point Te, a period having a termination point that is later than the excess point Te by the predetermined extra time Tm, or a period having an termination point that is equal to the termination point of the present time synchronization period Pn or of a default time synchronization period.

Referring to FIG. 4, the excess point Te at which the allowable time error range Egoal intersects the estimated time error curve Cn, i.e., the estimated time error curve Cn exceeds the allowable time error range Egoal, occurs after the termination of the present time synchronization period Pn.

Accordingly, in an embodiment, it may be estimated that, if the subsequent time synchronization period Pn+1 is determined to be equal to the present time synchronization period Pn, the time error will not exceed the allowable time error range Egoal until the subsequent time synchronization period Pn+1 is terminated. That is, even when the subsequent time synchronization period Pn+1 is maintained or slightly increased, the time error may remain within the allowable time error range Egoal.

Accordingly, the length of the subsequent time synchronization period Pn+1 may be determined to be equal to, or longer than, the present time synchronization period Pn+1 or longer than a default time synchronization period based on the excess point Te.

In an embodiment, the length of the subsequent time synchronization period Pn+1 may be determined to be, a period having a termination point earlier than the excess point by the amount of the predetermined extra time, a period having a termination point that is equal to the excess point, a period having a termination point that is later than the excess point by the amount of the predetermined extra time, or a period having a termination point that is equal to the present time synchronization period, or equal to a default time synchronization period.

In embodiments, error estimation information regarding the interval between the excess point and the initiating point of the present time synchronization period, or regarding whether the excess point is present after the terminating point of the present time synchronization period is generated. Thereafter, in embodiments, the length of the subsequent time synchronization period may be determined based on error estimation information according to a particular application.

Figure 5:
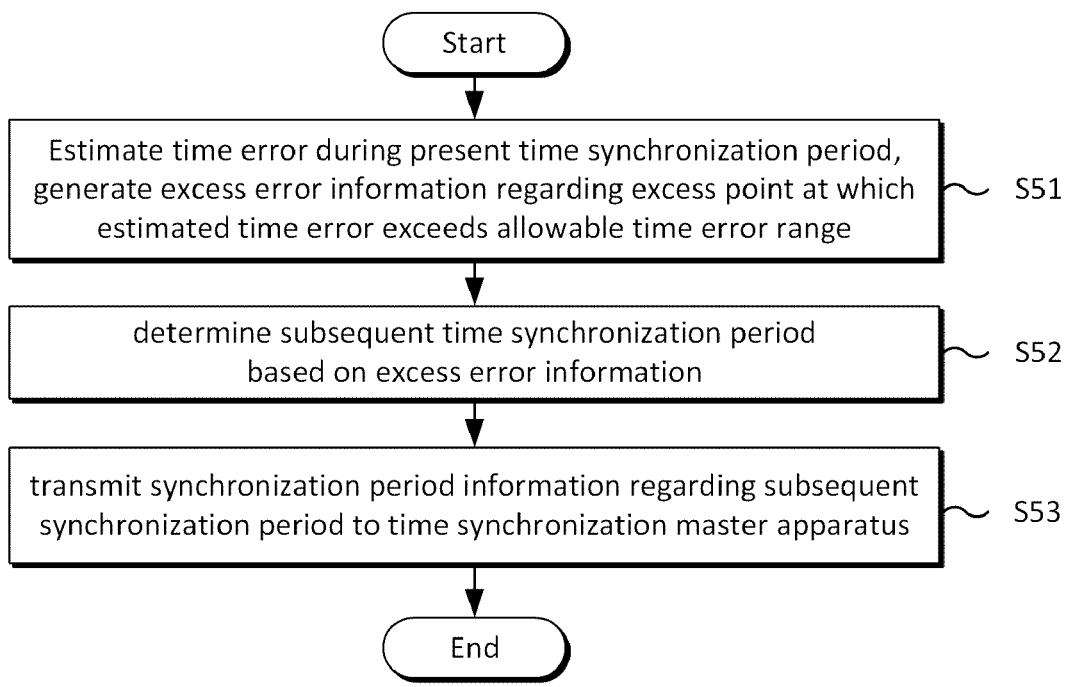
FIG. 5 is a flowchart illustrating an example of a method of determining a time synchronization period for a time synchronization slave apparatus.

FIG. 5 is a flowchart illustrating an example of a method of determining a time synchronization period for a time synchronization slave.

Referring to FIG. 5, the time synchronization slave apparatus includes a time synchronization processing unit configured to perform a time synchronization operation in conjunction with the time synchronization master apparatus that provides global time and to determine offset and rate used to correct local time based on calculated time error, and a timer configured to correct local time based on the offset and rate determined during a time synchronization operation.

Referring to FIG. 5, at step S51, the time synchronization slave apparatus estimates time error occurring in connection with local time during a present time synchronization period between a previous time synchronization operation and a subsequent time synchronization operation, and generates excess error information regarding an excess point at which the estimated time error exceeds a threshold allowable time error range.

In an embodiment, at step S51, the time synchronization slave apparatus may estimate time error occurring in connection with local time during the present time synchronization period based on time error calculated during the previous time synchronization operation.

In an embodiment, more specifically, the time synchronization slave apparatus may compare an estimated time error curve with an allowable time error range on the assumption that the estimated time error curve determined based on the time error calculated during the previous time synchronization operation is realized during the present time synchronization period.

Thereafter, the time synchronization slave apparatus may generate excess error information based on an excess point if the estimated time error curve exceeds the allowable time error range before the termination of the present time synchronization period. The time synchronization slave apparatus may generate excess error information indicating that the time error does not exceed the allowable time error range if the estimated time error curve exceeds the allowable time error range after the termination of the present time synchronization period.

In another embodiment, the time synchronization slave apparatus may compare the estimated time error curve with the allowable time error range. In this case, based on the assumption that the estimated time error curve determined based on the time error calculated during the previous time synchronization operation is realized during the present time synchronization period, the slave apparatus may generate excess error information based on an excess point at which the estimated time error curve exceeds the allowable time error range, which may occur before or after the termination of the present time synchronization period.

In an embodiment, the estimated time error curve may be represented by a linear function having a form in which time error corrected to 0 during a second previous time synchronization operation linearly increases to the calculated time error during the previous time synchronization operation. This estimated time error curve may be any of a rectilinear line that corresponds to a first-order function whose slope is positive, a curve of a positive-slope portion selected from the curve of a higher-order function or an index function, or a curve obtained by approximating a graph of empirically observed time errors.

At step S52, the time synchronization slave apparatus may determine a subsequent time synchronization period in which a subsequent time synchronization operation is scheduled after the termination of the present time synchronization period based on the excess error information.

In an embodiment, at step S52, the time synchronization slave apparatus may determine the subsequent time synchronization period based on the excess point if the excess point is earlier than a default time synchronization period, and may determine the subsequent time synchronization period based on the present time synchronization period or default time synchronization period if the excess point is not earlier than a default time synchronization period.

In another embodiment, the time synchronization slave apparatus may determine the subsequent time synchronization period based on the excess point if the excess point is different from the default time synchronization period, and may determine the subsequent time synchronization period based on the present time synchronization period or default time synchronization period if the excess point is not different from the default time synchronization period.

In an embodiment, the time synchronization slave apparatus may determine the subsequent time synchronization period based on a value obtained by subtracting or adding a predetermined extra time interval value based on a time interval value from the previous time synchronization operation to the excess point.

At step S53, the time synchronization slave apparatus may transmit synchronization period information regarding the determined subsequent time synchronization period to the time synchronization master apparatus.

A time synchronization slave apparatus and method according to example embodiments may adjust an additional load attributable to a time synchronization operation while ensuring time precision.

A time synchronization slave apparatus and method according to example embodiments may dynamically adjust an additional load attributable to a time synchronization operation by using a relatively simple algorithm.

A time synchronization slave apparatus and method according to example embodiments may decrease the time it takes for maximum time error to fall within a desired allowable time error range after the startup of an apparatus.

The above embodiments and the accompanying drawings are intended merely to clearly illustrate part of the technical spirit of the present application, and it will be apparent to those skilled in the art that modifications and specific embodiments that those skilled in the art can easily derive from the present specification and the accompanying drawings are all included in the range of the rights of the present application.

Furthermore, the apparatus according to an embodiment may be implemented as a computer-readable code on a computer-readable storage medium. The computer-readable storage medium includes all types of storage devices on which data that can be read by a computer system is stored. Examples of the computer-readable storage medium include read-only memory (ROM), random access memory (RAM), an optical disk, a magnetic tape, a floppy disk, nonvolatile memory, etc. Furthermore, the computer-readable storage medium may be distributed across computer systems connected to each other over a network, and computer-read able code may be stored and executed in the computer systems in a distributed manner.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:
1. A time synchronization slave apparatus, comprising:
one or more processors configured to:
perform a time synchronization operation in conjunction with a time synchronization master apparatus that provides global time;
determine an offset and a rate used to correct local time based on a calculated time error;

correct the local time based on the determined offset and rate during each of a plurality of time synchronization operations;

generate an estimated time error curve of a present time synchronization period based on a time error curve of a previous synchronization period ending at a time at which the present time synchronization period begins, the time error curve of the previous synchronization period including a change of an error, calculated as a result of a previous time synchronization operation, over time during the previous synchronization period;

generate excess error information regarding an excess point at which the estimated time error curve exceeds a threshold;

determine a duration of a subsequent time synchronization period, starting at an end of the present time synchronization period, based on a determination of whether the excess point of the excess error information is positioned before or after the end of the present time synchronization period;

transmit synchronization period information regarding the subsequent time synchronization period to the time synchronization master apparatus;

determine the duration of the subsequent time synchronization period to be shorter than a duration of the present time synchronization period in response to the excess point of the excess error information being determined to be positioned before the end of the present time synchronization period; and determine the duration of the subsequent time synchronization period to be longer than the duration of the present time synchronization period in response to the excess point of the excess error information being determined to be positioned after the end of the present time synchronization period.

2. The time synchronization slave apparatus of claim 1, wherein the one or more processors are further configured to:

compare the estimated time error curve with the threshold, based on an assumption that the estimated time error curve is realized during the present time synchronization period; and generate the excessive error information based on the excess point, in response to the estimated time error curve exceeding the threshold before the end of the present time synchronization period.

3. The time synchronization slave apparatus of claim 2, wherein the estimated time error curve is represented by a linear function having a form in which the time error is corrected to 0 during another previous time synchronization operation and linearly increases to the calculated time error during the previous time synchronization operation.

4. The time synchronization slave apparatus of claim 1, wherein the one or more processors are further configured to:

compare the estimated time error curve with the threshold, based on an assumption that the estimated time error curve is realized during the present time synchronization period; and generate the excess error information based on the excess point.

5. The time synchronization slave apparatus of claim 1, wherein the one or more processors are further configured to:

determine the subsequent time synchronization period based on the excess point, in response to the excess point occurring earlier than the end of the present time synchronization period or an end of a default time synchronization period determine the subsequent time synchronization period based on the present time synchronization period or the default time synchronization period, in response to the excess point not occurring earlier than the end of the present time synchronization period or the end of the default time synchronization period.

6. The time synchronization slave apparatus of claim 5, wherein the one or more processors are further configured to determine the subsequent time synchronization period based on a value obtained by subtracting or adding an extra time interval value, which is based on a time interval value from the previous time synchronization operation, to the excess point.

7. The time synchronization slave apparatus of claim 1, wherein the one or more processors are further configured to:

determine the subsequent time synchronization period based on the excess point, in response to the excess point corresponding to a time that is different from the end of the present time synchronization period, or an end of a default time synchronization period;

determine the subsequent time synchronization period based on the present time synchronization period or the default time synchronization period, in response to the excess point corresponding to a time that is not different from the end of the present time synchronization period or the end of the default time synchronization period.

8. The time synchronization slave apparatus of claim 1, wherein the time synchronization operation is performed according to any one or any combination of any two or more of Network Time Protocol (NTP), Simple Network Time Protocol (SNTP), and Precision Time Protocol (PTP).

9. The time synchronization apparatus of claim 1, wherein the duration of the subsequent time synchronization period is determined to be shorter than a duration of the present time synchronization period, or longer than the duration of the present time synchronization period, based on the position of the excess point in relation to a termination point of the present time synchronization period.

10. A method of determining a time synchronization period by a time synchronization slave apparatus, the method comprising:

performing a time synchronization operation in conjunction with a time synchronization master apparatus that provides global time;

determining an offset and a rate used to correct local time based on a calculated time error;

correcting the local time based on the determined offset and rate during each of a plurality of time synchronization operations;

generating an estimated time error curve of a present time synchronization period based on a time error curve of a previous synchronization period ending at a time at which the present time synchronization begins, the time error curve of the previous synchronization period including a change of an error, calculated as a result of a previous time synchronization operation, over time during the previous synchronization period;

generating excess error information regarding an excess point at which the estimated time error curve exceeds a threshold;

determining a subsequent time synchronization period, starting at an end of the present time synchronization period, based on a determination of whether the excess point of the excess error information is positioned before or after the end of the present time synchronization period;
transmitting synchronization period information regarding the determined subsequent time synchronization period to the time synchronization master apparatus;
determining the subsequent time synchronization period to be shorter than a duration of the present time synchronization period in response to the excess point of the excess error information being determined to be positioned before the end of the present time synchronization period; and
determining the subsequent time synchronization period to be longer than the duration of the present time synchronization period in response to the excess point of the excess error information being determined to be positioned after the end of the present time synchronization period.

11. The method of claim 10, wherein the generating of the excess error information further comprises:
comparing the estimated time error curve with the threshold, based on an assumption that the estimated time error curve is realized during the present time synchronization period; and
generating the excess error information based on the excess point, in response to the estimated time error curve exceeding the threshold before the end of the present time synchronization period.

12. The method of claim 11, wherein the estimated time error curve is represented by a linear function having a form in which the time error is corrected to 0 during another previous time synchronization operation and linearly increases to the calculated time error during the previous time synchronization operation.

13. The method of claim 10, wherein the generating of the excess error information further comprises:
comparing an estimated time error curve with the threshold, based on an assumption that the estimated time error curve is realized during the present time synchronization period; and
generating the excess error information based on the excess point.

14. The method of claim 10, wherein the determining of the subsequent time synchronization period comprises determining the subsequent time synchronization period based on the excess point, in response to the excess point occurring earlier than the end of the present time synchronization period or an end of a default time synchronization period, and determining the subsequent time synchronization period based on the present time synchronization period or default time synchronization period, in response to the excess point not occurring earlier than the end of the present time synchronization period or the end of the default time synchronization period.

15. The method of claim 14, wherein the determining of the subsequent time synchronization period comprises determining the subsequent time synchronization period based on a value obtained by subtracting or adding an extra time interval value, which is based on a time interval value from the previous time synchronization operation, to the excess point.

16. The method of claim 10, wherein the determining of the subsequent time synchronization period comprises determining the subsequent time synchronization period based on the excess point, in response to the excess point corresponding to a time that is different from the end of present time synchronization period or an end of a default time synchronization period, and determining the subsequent time synchronization period based on the present time synchronization period or the default time synchronization period, in response to the excess point not occurring earlier than the end of the present time synchronization period or the end of the default time synchronization period.

17. The method of claim 10, wherein the time synchronization operation is performed according to any one or any combination of any two or more of Network Time Protocol (NTP), Simple Network Time Protocol (SNTP), and Precision Time Protocol (PTP).

18. A non-transitory computer-readable medium storing instructions that, when executed by a processor, cause the processor to perform the method of claim 10.

19. The method of claim 10, wherein the estimated time error curve of the present time period represents error between the master device and the slave device as a function of time, and the time error curve of the previous synchronization period represents error between the master device and the slave device as a function of time.

20. The method of claim 19, further comprising further comprising determining the excess point at which the estimated time error curve of the present time period exceeds the threshold, and decreasing a duration of the subsequent time synchronization period, in response to the excess point occurring before the end of the present time synchronization period.

21. The method of claim 20, further comprising increasing the duration of the subsequent time synchronization period, in response to the excess point occurring after the end of the present time synchronization period.

22. A time synchronization apparatus, comprising:
a master device; and
a slave device comprising one or more processors configured to:
perform a time synchronization operation in conjunction with the master device;
determine an offset and a rate used to correct local time based on a calculated time error;
generate an estimated time error curve of a present time synchronization period based on a time error curve of a previous synchronization period ending at a time at which the present time synchronization begins;
correct the local time based on the determined offset and rate during each of a plurality of time synchronization operations;
estimate the time error in the local time during the present time synchronization period and generate excess error information regarding an excess point at which the estimated time error curve exceeds a threshold, the time error curve of the previous synchronization period including a change of an error, calculated as a result of a previous time synchronization operation, over time during the previous synchronization period;
determine a subsequent time synchronization period in which the subsequent time synchronization operation is scheduled at an end of the present time synchronization period, based on a determination of whether the excess point of the excess error information is positioned before or after the end of the present time synchronization period,
transmit synchronization period information regarding the subsequent time synchronization period to the master device;
determine the duration of the subsequent time synchronization period to be shorter than a duration of the present time synchronization period in response to the excess point of the excess error information being determined to be positioned before the end of the present time synchronization period; and determine the duration of the subsequent time synchronization period to be longer than the duration of the present time synchronization period in response to the excess point of the excess error information being determined to be positioned after the end of the present time synchronization period.

\* \* \* \* \*